(12) United States Patent
Nguyen et al.

(10) Patent No.: US 6,644,736 B2
(45) Date of Patent: Nov. 11, 2003

(54) PRIVACY SEAT DIVIDER FOR TRANSPORT VEHICLES

(75) Inventors: Tony Hoang Nguyen, Renton, WA (US); James D. Callahan, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/061,561

(22) Filed: Feb. 1, 2002

(65) Prior Publication Data

US 2003/0146654 A1 Aug. 7, 2003

(51) Int. Cl.[7] .................................................. A47C 7/62
(52) U.S. Cl. ............................ 297/184.17; 297/184.15; 160/84.07
(58) Field of Search ...................... 297/184.1, 184.15, 297/184.17, 188.04, 188.06, 188.07, 463.2; 160/84.07, 134

(56) References Cited

U.S. PATENT DOCUMENTS

| | | | |
|---|---|---|---|
| 460,325 A | * | 9/1891 | Rosenthal .................... 160/134 |
| 823,096 A | * | 6/1906 | Armstrong .................. 160/134 |
| 1,808,652 A | * | 6/1931 | Gump ..................... 160/84.07 |
| 2,420,251 A | | 5/1947 | Foriyes |
| 2,602,492 A | | 7/1952 | Fowler et al. |
| 3,019,050 A | | 1/1962 | Spielman |
| 3,628,829 A | | 12/1971 | Hellig |
| 4,093,305 A | * | 6/1978 | Staroste et al. ........ 297/187.17 |
| 4,930,838 A | | 6/1990 | Brabant |
| 5,123,707 A | * | 6/1992 | Wurzell ...................... 297/464 |
| 5,316,369 A | | 5/1994 | Kanda |
| 5,368,359 A | | 11/1994 | Eakin |
| 5,395,157 A | | 3/1995 | Rollo et al. |
| 5,511,259 A | * | 4/1996 | Tarara ................... 297/184.17 |
| 5,564,784 A | | 10/1996 | Felling |
| 5,795,018 A | * | 8/1998 | Schumacher et al. .. 297/184.17 |
| 5,857,745 A | | 1/1999 | Matsumiya |
| 6,046,754 A | | 4/2000 | Stanek |
| 6,113,183 A | | 9/2000 | Koch et al. |
| 6,116,326 A | | 9/2000 | Domina et al. |
| 6,142,574 A | * | 11/2000 | Alexander ............... 297/188.2 |

FOREIGN PATENT DOCUMENTS

BE    5564850    *    4/1957   ................. 160/134

* cited by examiner

*Primary Examiner*—Peter R. Brown
(74) *Attorney, Agent, or Firm*—Dipinto & Shimokaji, P.C.

(57) ABSTRACT

A fan-type foldable device for sub-dividing for privacy purposes, the space occupied by a passenger seated in a moving vehicle or a movie theatre, is described. The fan type device incorporates a means for coupling onto a side of a seat back, thereby maintaining privacy within the sub-divide. Said fan type device folds out of the way when not in use. The fan type foldable device may be used in a seating arrangement wherein rows of seats are divided by the fan type such that each seated passenger is able to enjoy privacy from adjoining passengers.

8 Claims, 5 Drawing Sheets

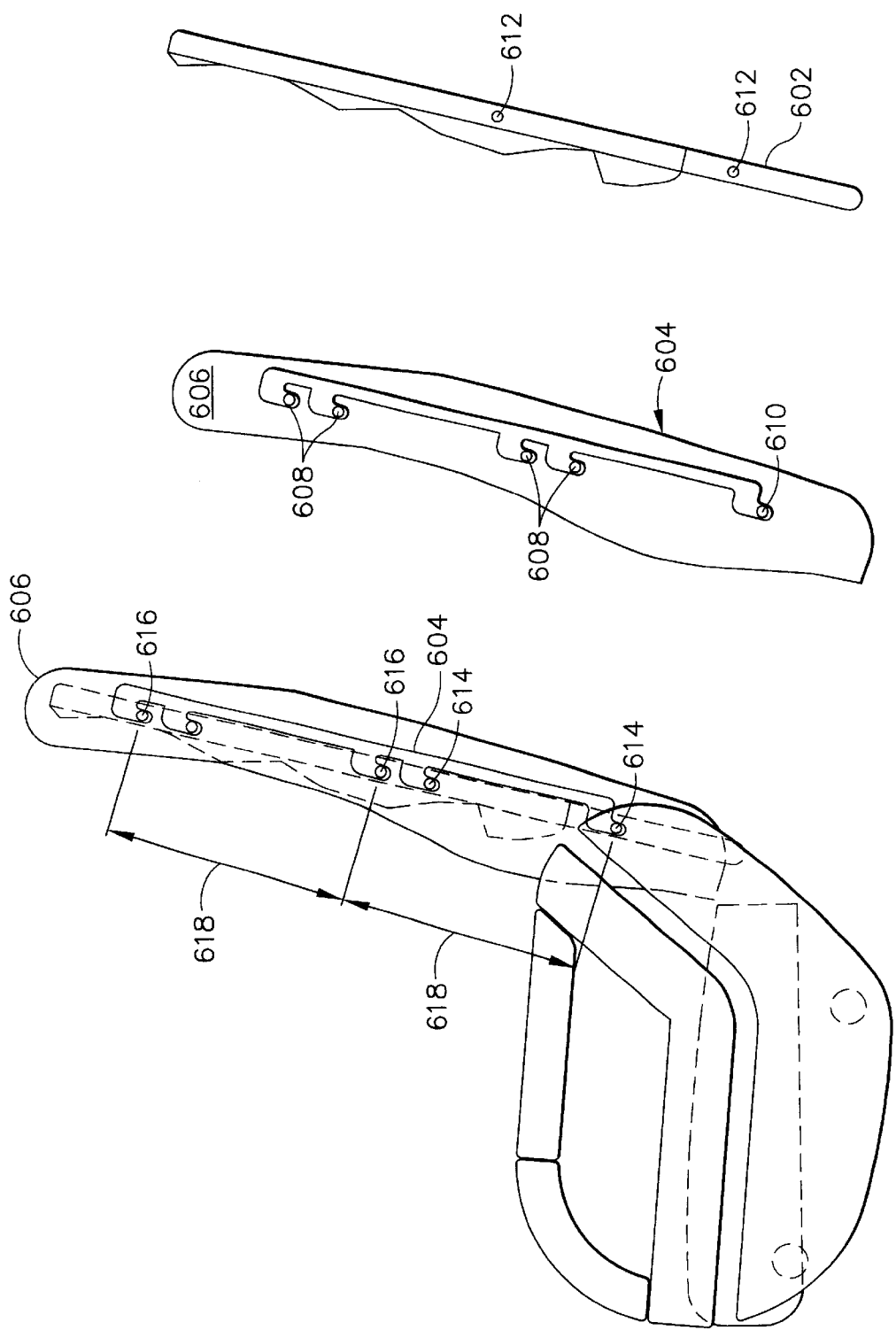

PRIVACY SEAT DIVIDER FOR TRANSPORT VEHICLES

BACKGROUND OF THE INVENTION

This invention relates to seating devices for passenger transport vehicles and, more specifically, to apparatus and methods that provide privacy between seats for passengers utilizing transport vehicles such as aircraft, trains, and buses.

Fans often in the shape of a long triangle or of a semicircle, for waving lightly in the hand to create a cooling current of air about a person have been used for a long time. A special kind of folding fan known as Chinese fan, or brise fan is used by Chinese, French, and others. It consists of a set of blades or sticks connected by rivets or other fasteners, through which the blades hinge and space apart. The result is that a semi-circle or arc is spanned by the set of blades or sticks and moved for cooling purposes. Alternatively, a screen may be applied on top of the sticks.

U.S. Pat. No. 6,046,754, entitled Display Shutter Device for View Protection on a Portable Computer, teaches a display shutter device for view protection on a portable computer. The shutter device is disposed integrally within the bezel of a portable computer. The shutter device can be disposed proximate the two sides of a display within the bezel.

U.S. Pat. No. 5,795,018, entitled Passenger Service Terminal Particularly in Passenger Cabin of an Aircraft, teaches a passenger service terminal, for example in an aircraft, includes comfort and service components such as a reading lamp, a flight attendant call button, a loudspeaker, an air nozzle, an oxygen mask, an oxygen generator, and an optical display element incorporated in a separate support bail or support rod that cooperates with but remains separate from a passenger seat.

U.S. Pat. No. 6,113,183, entitled Privacy Shroud for Aircraft Seats, teaches a privacy shroud assembly specifically designed to increase the privacy of an occupant of a chair structure when the chair structure is in a reclined position for extended periods of rest or sleep.

However, none of the above patents disclose the use of a Chinese fan, or brise fan as a divider. Neither do the above patents teach storing the divider for any type of seat to create privacy for passengers of aircraft, busses, trains, and other similar passenger conveyance means in the extended position.

As can be seen, there is a need for folding type privacy divide that can maintain some level of privacy for a group of passengers sitting in close proximity. Ease of use and storage of the privacy divide is desirable. Accordingly, the above folding type divide structure fits the purpose. As can be appreciated, a folding type divider has a relatively simple structure as compare with the above cited prior art patents. Further, a folding type divider can be folded and stored at a convenient location occupying a minimum of space. Therefore, it is desirable to have a folding fan-type divider that may be stored at a location occupying less space when not in use.

SUMMARY OF THE INVENTION

In one aspect of the present invention, there is disclosed a device for sub-dividing a space, which comprises a plurality of elongated dividing members each having, a first end rotably connected with the rest of the plurality of elongated dividing members by a connecting portion, wherein the connecting portion comprises a relatively non-moving point in relation to other connecting portions of the plurality of elongated first members, thereby forming a collective connecting portion, and a second end capable of moving apart from the plurality of second ends of the other members in a uniform manner, thereby using the length of the elongated dividing member as a radius spanning an area wherein the area forms part of a circle for subdividing a space; and a mounting member coupled to the collective connecting portion disposed to be coupled to a mounting object having at least one stable location for spanning the area for subdivision. In another aspect of the present invention, there is disclosed a seat having a device for sub-dividing a space, which comprises a seating portion having a substantially flat surface for seating; a back member coupled to the substantially flat surface, the back member comprises an inner back surface and two side surfaces, each side surface having a breadth that is substantially the thickness of the back member; a sliding member integrally attached to at least one side surface. And a privacy fan-type for sub-dividing a space, which comprises a plurality of elongated dividing members each having, a first end rotably connected with the rest of the plurality of elongated dividing members by a connecting portion, wherein the connecting portion comprises a relatively non-moving point in relation to other connecting portions of the plurality of elongated first members, thereby forming a collective connecting portion, and a second end capable of moving apart from the a plurality of second ends of the other members in a uniformly manner, thereby using the length of the elongated dividing member as a radius spanning an area wherein the area forms part of a circle for subdividing a space; and a mounting member coupled to the collective connecting portion disposed to be coupled to the sliding member having at least one stable location for spanning the area for subdivision.

In a further aspect of the present invention, a seating arrangement, which comprises at least two rows of seats, each row includes a plurality of seats. Each seat comprises a seating portion having a substantially flat surface for seating; a back member coupled to the substantially flat surface, the back member comprises an inner back surface and two side surfaces, each side surfaces having a breadth that is substantially the thickness of the back member; a sliding member integrally attached to at least one side surface; and a privacy fan-type for sub-dividing a space. The privacy fan-type comprises a plurality of elongated dividing members each having, a first end rotably connected with the rest of the plurality of elongated dividing members by a connecting portion, wherein the connecting portion comprises a relatively non-moving point in relation to other connecting portions of the plurality of elongated first members, thereby forming a collective connecting portion, and a second end capable of moving apart from the a plurality of second ends of the other members in a uniformly manner, thereby using the length of the elongated dividing member as a radius spanning an area wherein the area forms part of a circle for subdividing a space; and a mounting member coupled to the collective connecting portion disposed to be coupled to the sliding having at least one stable location for spanning the area for subdivision.

In yet a further aspect of the present invention, a method for dividing a space between two seats, comprising the steps of providing a fan-type; attach the fan-type to one of the two seats; and opening the fan-type.

These and other features, aspects and advantages of the present invention will become better understood with reference to the following drawings, description and claims.

BRIEF DESCRIPTION OF THE DRAWINGS

FIG. 6 is a side view of the present invention in use on a back side of a seat.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
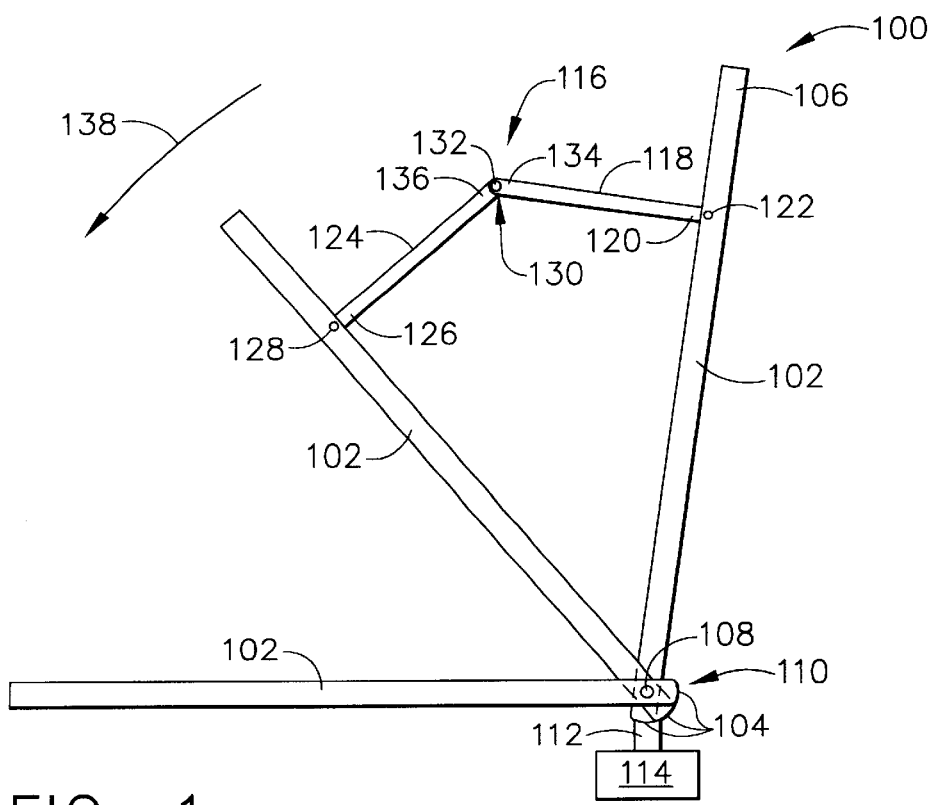
FIG. 1 depicts a schematic view of the present invention.

Referring to FIG. 1, a device 100 is shown for sub-dividing a space and thereby providing privacy between seats for transport vehicles. The transport vehicles contemplated may include airplanes, buses, trains, oceans liners, riverboats, and any other similar type utilizing rows of seats and for which a divide is desirable. The device 100 generally may comprise a set of elongated members 102. The elongated members 102 may be made of rigid or semi-rigid materials such as metal and various metal alloys, polymers in various form, and composite materials. Each elongated member 102 has an elongated shape comprising a first end 104 and a second end 106. The first end 104 has a hinging point 108 that connects the whole set of elongated members 102. In other words, the set of elongated members 102 first ends 104 comprise a connecting portion 110 that connects the whole set of elongated members 102. The elongated members 102 rotate in relation to each other using the hinging point 108 as a stationary point. The second end 106 is capable of moving apart from the plurality of second ends 106 of the other members in a uniformly manner. The length of the elongated dividing member 102 may be used as a radius spanning an area by spacing the elongated member 102 apart from each other, thus the area forms part of a circle or arc for subdividing a space. The subdivided space may be the space between any rows of seats, or seats of the same row, and is defined as a three dimensional system having a space for subdivision. In other words, device 100 subdivide a three dimensional space between, for example, two seats. The elongated members 102 may be covered by folding materials (not shown) such as some form of fabric made out of silk, man-made fiber, cotton, etc which apply fire retard or any kind of material not easy to catch fire. In other words, folding material covers elongated member 102 for a more consistent subdivision of the three dimensional subspace. Folding materials comprise folding lines (also not shown) in that when the elongate dividing members are not moving apart in relation to each other, the utilized folding material folds at each folding lines such that the folding material forms sub-areas each stacked on top of the other as shown in later Figures. The above structure is very similar in form or structure to a brise fan. The folding material is analogous to the screen of a brise fan. An intermediate piece 112 may be provided for connecting the congregate of first ends 104 of the elongated members 102 defined as a collective connecting portion 110. The intermediate piece 112 is further connected to a mounting member 114, which can cause the device to stay in a set of relatively stable points, thus providing a subdivide at various locations. In other words, a subdivide can be provided such that the three dimensional subspace varies with the location of the relatively stable points in that the location of the mounting member determines the location of the subdivide and therefore the location of device 100.

A set of linking members 116 may be provided (only one shown) comprising a first element 118 having a first end 120 connected to a first connecting point 122 located on a first elongated member 102 between its first end 104 and second end 106, and a second element 124 having a second end 126 connected to a second connecting point 128 located on a second elongated member 102 that is adjacent to the first elongated member 102. In addition, the second point 128 is at a similar location between the first end 104 and second end 106 of the second elongated member 102 in relation to the first elongated member 102. The linking member 116 further comprises folding section 130 having a hinge element 132 connected to a second end 126 of the first element 118 and the first end 120 of the second element 124. The linking members 116 are capable of holding all of the elongated members 102 into a stack when the first elements 118 and the second elements 124 are fully folded in that first elements 118 and second elements 124 both may rotate in a clockwise direction about hinge 132 until they overlap each other. First elements 118 and the second elements 124 are fully folded when the inventive device 100 is not in use. When device 100 is in use, linking members 116 are extended to a degree which is limited only by the combined length of the first element 118 and the second element 124 of the linking members 116. It is contemplated that each adjacent elongated member 102 may have a linking member 116 spanning therebetween. As can be appreciated, the linking members 116 enhance structure stability for device 100 in that elongated members 102 are connected together at points other than hinging point 108. The device 100 may be opened or put to use by spacing apart the dividing elongated members 102 in a unidirectional direction 138, or a bidirectional direction. In the unidirectional situation, each of the top and bottom of the stack of dividing elongated members 102 may be kept relatively stationary in relation to other elongated members 102.

It should be noted that the number of the set of elongated members 102 may be comprised of more than three, whereas FIG. 1 merely depicts three for the sake of simplicity and ease of demonstration. In practice, a plurality of elongated members 102 may be used.

Figure 2:
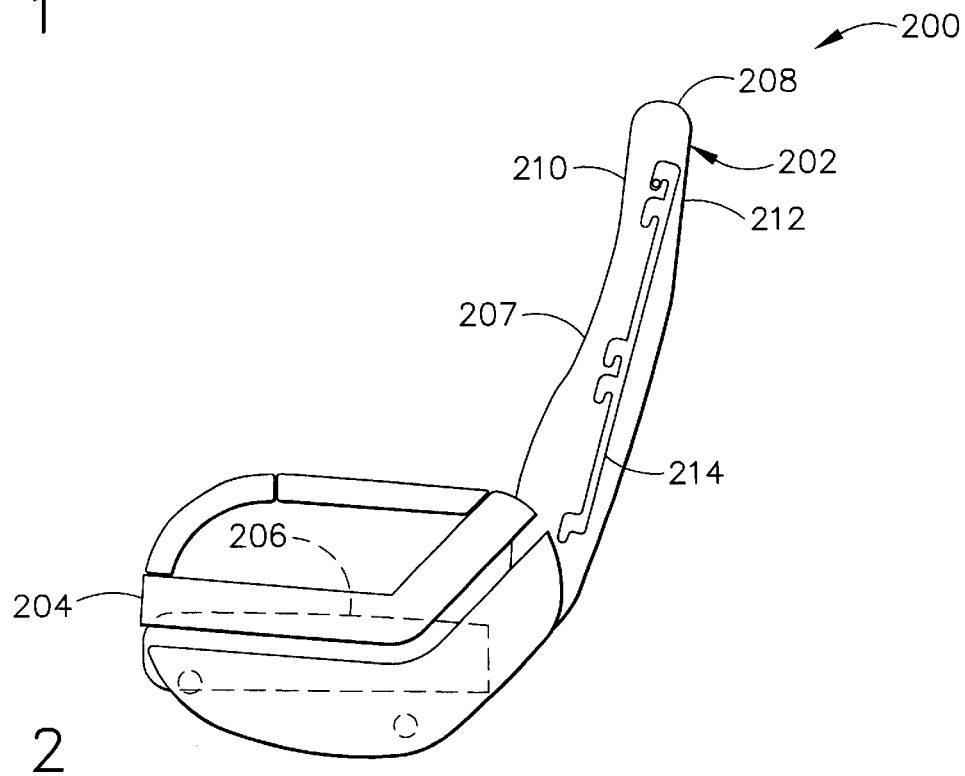
FIG. 2 is a side view of a seat incorporating the present invention shown in a stowed position.

Referring to FIG. 2, there is shown a seat 200 wherein a fan fold of the present invention may be applied. The seat 200 has an aft support seat 202 for sub-dividing a space. Aft support seat 202 may include similar elements as device 100 of FIG. 1. The seat may further include a seating portion 204 that has a substantially flat surface 206 for a passenger to sit on. A back member 208 is coupled to the substantially flat surface 206. The back member 208, which is coupled to the seating portion 204, comprises an inner back surface 210 and two side surfaces of which only one side back support seat 212 is shown. Each side of back seat support 212 has a depth that is substantially the thickness of the back member 208. Back member 208 comprises two sides (only one is shown) such as side 207. A sliding member 214 is integrally attached to at least one side surface of back member 208. This integral attachment may be achieved through various means including screws, bolts, rivets, or any suitable attaching means. The aft support seat 202 may be a privacy fan-type for sub-dividing a space, which can be first folded, and then slid down to a stowed position that is in alignment with the length of any one of the two side of back seat support 212. This may be accomplished through a rail that supports the inventive privacy fan type. It is noted that the length of the rail may substantially span the length of any of the two side surfaces, such as side surface 207. In addition, the rail may extend further on the back surface such as side surface 207, if called for, to the seating portion 204 and beyond, if there exists enough space for a suitable extension. A mounting member (not shown), such as device 100 of FIG. 1, that may be a part of, or may be an extension to the fan-type, is coupled to the collective connecting portion (as shown in FIG. 1) of the fan-type. It is disposed to be coupled to the sliding member such as the rail that has at least one stable location for spanning the area for subdivision. An embodiment of the above is depicted in FIG. 6.

It is noted that FIG. 2 shows only one side surface 207, to which the rail is mounted for stowing the folded fan-type. But in carrying out the present invention, both side surfaces may have the rail mounted thereupon.

Figure 3:
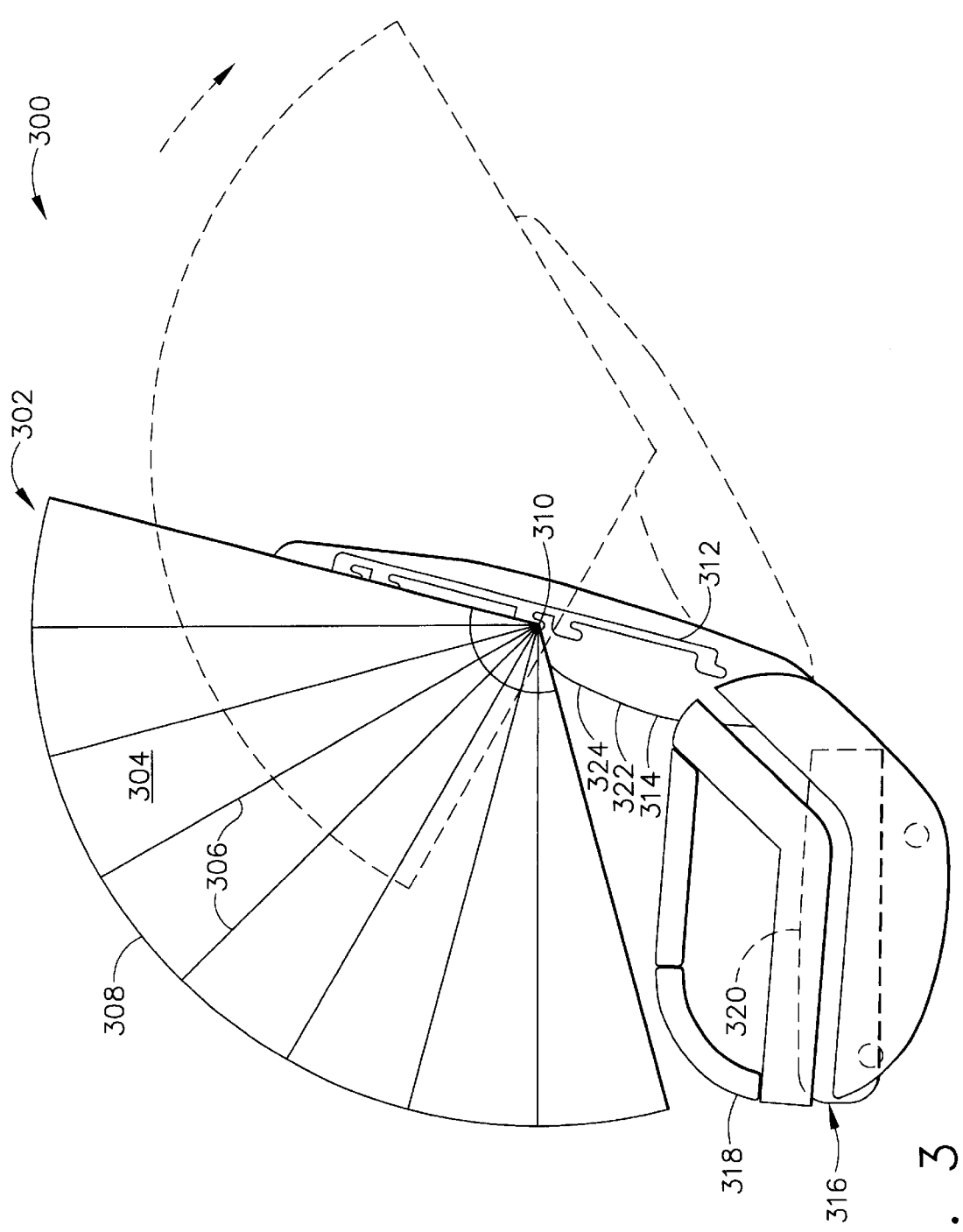
FIG. 3 is a side view of a seat incorporating the present invention in the deployed position.

Referring to FIG. 3, numeral 300 denotes an application using an inventive unfolded fan-type 302 mounted on one side of a reclinable seat for which the present invention may be adapted. Fan types 302 may be used for transport vehicle passenger seats, or they may be used for non-transportational seating situations, including movie theatres. The transport vehicles, for which the inventive privacy seat divide may be used, include airplanes, buses, trains, oceans liners, riverboats, and other similar vehicles using rows of seats where a privacy divide is desirable. The fan-type 302 generally comprises a set of elongated members (shown on FIG. 1). The elongated members may be made of rigid or semi-rigid materials such as metal and various metal alloys, polymers in various forms, and composite materials. Each elongated member has an elongated shape and comprises a first end and a second end. The first end has a hinging point that connects the whole set of elongated members. In other words, the set of elongated members' first ends comprise a connecting portion that connects the whole set of elongated members. The elongated members rotate in relation to each other using the hinging point as a relatively non-moving point. The second end is capable of moving apart from the plurality of second ends of the other members in a uniformly manner, thereby using the length of the elongated dividing member as a radius spanning an area wherein the area forms part of a circle for subdividing a space. The space may be the space between any rows of seats or among one of the rows of seats. The elongated members may be covered by folding materials 304 such as some form of fabric made out of silk, man-made fiber, cotton, etc which apply fire retard or any kind of material not easy to catch fire. Folding materials 304 comprise folding lines 306. When the elongate dividing members are not moving apart in relation to each other, the utilized folding material 304 folds at each folding line 306 such that the folding material 304 forms sub-areas that are limited by adjacent folding lines 306, and the extent of the folding material. In other words, similar to a folding fan, the folding material may be subdivided along folding lines into various areas when folded. For example, a line segment of line 308 may form one side of the area, and two adjacent folding lines 306 form another two sides of the area. Sub-areas may be each stacked on top of the other along the folding lines 306. This is very similar in form or structure with a brise fan. The folding material 304 is similar to the screen of a brise fan. The elongated members 102 are analogous to the sticks or blades of the brise fan. An intermediate piece (not shown) may be provided for connecting the congregate of first ends of the elongated members defined as a collective connecting portion. The intermediate piece is further connected to a mounting member (also not shown), which can stay in a set of relatively stable points, thus provide a subdivide at various locations.

A linking member (not shown) may be provided comprising a first element having a first end connected to a first connecting point located on a first elongated member between its first end and second end, and a second element having a second end connected to a second connecting point located on a second elongated member that is adjacent to the first elongated member. In addition, the second point is at a similar location between the first end and second end of the second elongated member in relation to the first elongated member. The linking member further comprises folding section having a hinge element connected to a second end of the first element and the first end of the second element. The linking members are capable of holding all the elongated members into a stack when the first elements and the second elements are fully folded. This is a state wherein the fan-type 302 is not in use. When fan-type 302 is in use, linking members are extended limited only by the combined length of the first element and the second element. It is contemplated that each adjacent elongated member has a linking member spanning therebetween. As can be appreciated, the linking members enhance structure stability of fan-type 302. Still referring to FIG. 3, a coupling member 310 that forms an extension of the fan-type 302 acts as an extension or may be an integral part of the fan-type 302. It can be stable or non-moving at a location among several locations. In other words, fan-type 302 may be adjusted along sliding member 214 such as the rail 312. Thus, coupling member 310 causes the fan-type 302 to remain stationary at a particular location when the fan-type 302 is open or is in use. The coupling member 310 may be disposed to slide along a rail 312 that spans the length of a side surface of back seat 212. In other words, the fan-type 302, via the coupling member 310, may slide along rail 312 and be stable at various points on the rail 312.

A seat 316 wherein a fan fold or privacy seat divider of the present invention may be applied is described. The seat 316 may have the fan-type 302 for sub-dividing a space. The seat 316 may further include a seating portion 318 that has a substantially flat surface 320 for a passenger to sit on. A back support seat 322 is coupled to the substantially flat surface 320. The back support seat 322, which is coupled to the seating portion 318, comprises an inner back surface 324 and two side surfaces of which only one surface 314 is shown. Each side surface of back seat 212 has a width that is substantially the thickness of the back member. A sliding member 328 is integrally attached to at least one side surface. This integral attachment may be achieved through various means including screws, bolts, rivets, or any suitable attaching means. The fan-type 302 may be a privacy foldable fan-type for sub-dividing a space, which can be first folded, and then slide down to a stow position that is in alignment with the length of any one of the two side surfaces 314. This may be accomplished through the rail 312 that supports the privacy fan type. It is noted that the length of the rail 312 may substantially span the length of any of the two side surfaces. In addition, the rail 312 may extend further, if called for, to the seating portion and beyond, if there exists enough space for suitable extension. In others words, if rail 312 can be accommodated somewhere on the seat, it may extend beyond the side portion of the back of a seat. The mounting member 310 that may be a part of, or may be an extension to the fan-type 302, is coupled to the collective connecting portion (not shown) of the fan-type, which is disposed to be coupled to the sliding member 328 such as the rail 312 that has at least one stable location for spanning the area for subdivision.

When the fan-type 302 is folded along folding lines 306, it forms a semi-solid bundle that can be slid along rail 312 and stowed in a storage position.

The forward back surface 324 of the seat 300 may be reclinable thereby carrying the fan type 302 along since it is attached to the seat 300. Since the occupant of the seat 300 follows the forward back surface 324, the privacy for the seat's occupant is maintained regardless of position of the seat forward back surface 324.

Figure 4:
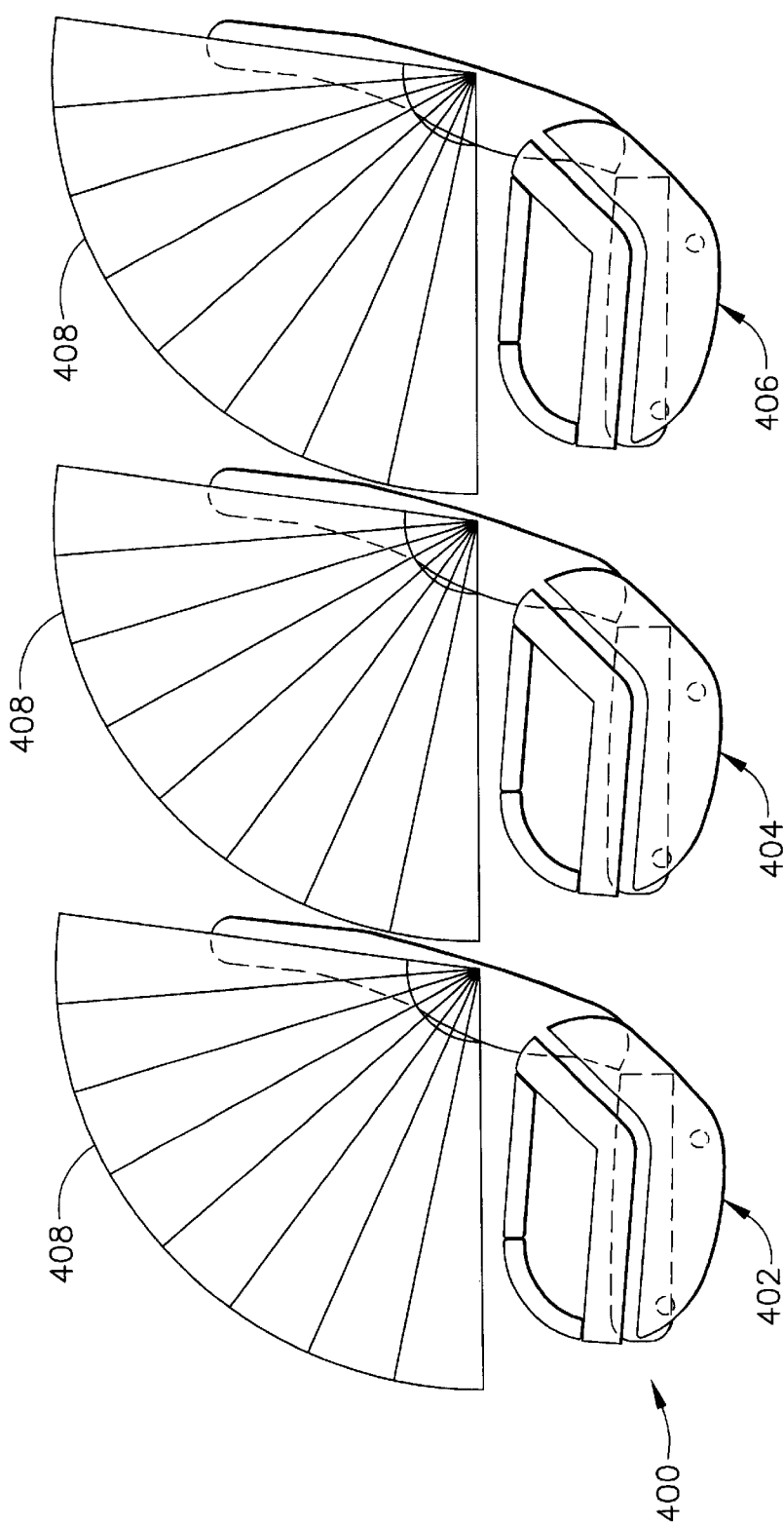
FIG. 4 is a side view of rows of seats illustrating the present invention in use.

Referring to FIG. 4, a side view 400 of a plurality of rows of seats implementing the present invention is depicted. A first row 402, a second row 404 immediately behind the first row 402, and a third row 406 immediately behind the second row 404 are described. Only the first seat of each row is shown. Fan-types 408 for the first seat on each row are extended for use. In other words, fan-type 408 is deployed in the open position. As can be appreciated, the present invention provides elegance, ease of use, and maintenance of privacy between seats.

Figure 5:
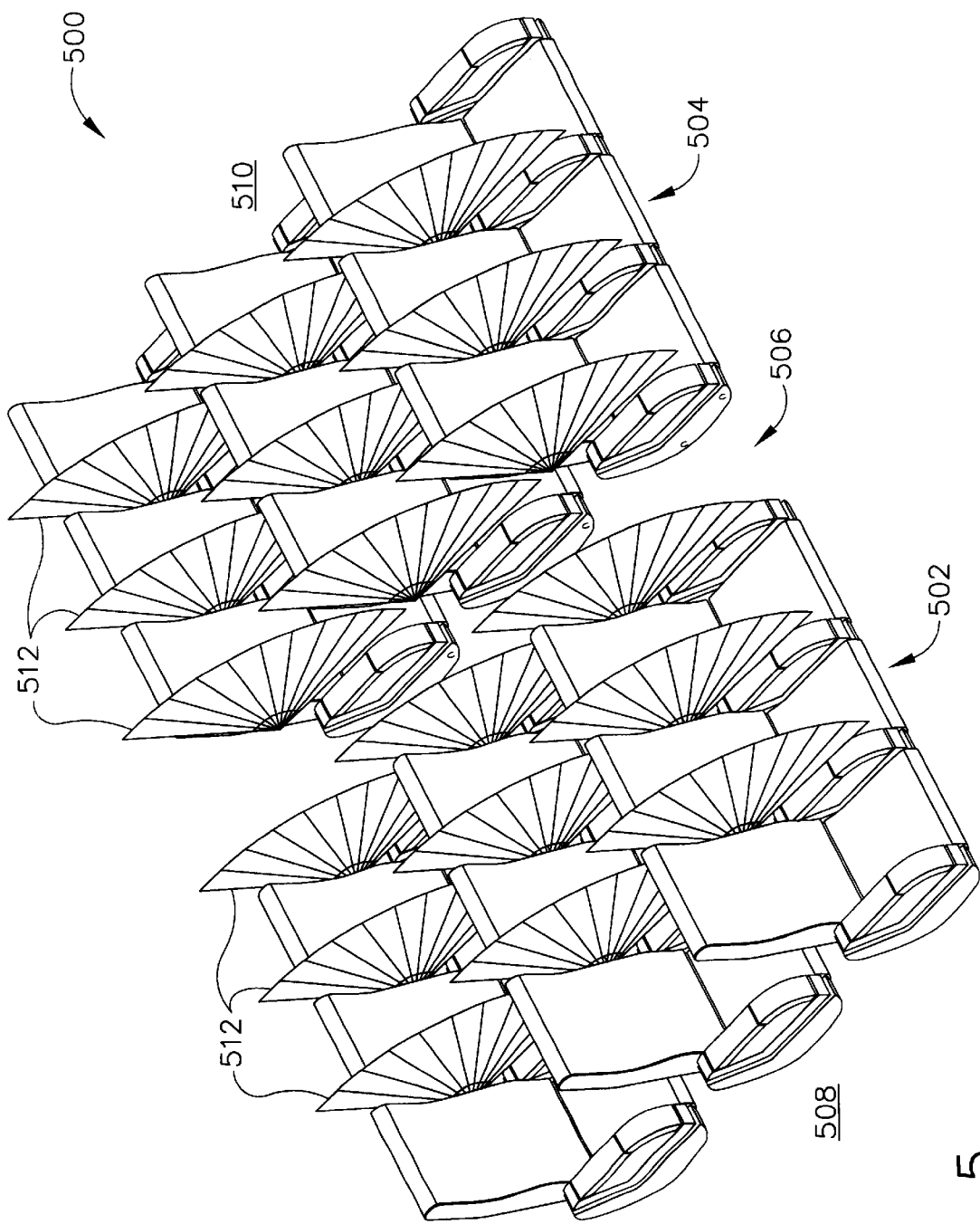
FIG. 5 is a perspective view of the present invention in use on a multiplicity of seats.

Referring to FIG. 5, there is shown a plurality of rows of seats 500 employing the present invention. A first row 502 and a second row 504 are described. An aisle 506 is located between first column 502 and second column 504. For example, FIG. 5 may depict the portions of the inside of an airplane having a first window side 508 and a second window side 510. A plurality of privacy divides 512 separate some of the seats. There is no need to have privacy divides 512 at the window sides 508 and 510. As an alternative embodiment, there may be more than one privacy divide between two seats, i.e. one on each seat. In other words, between two seats, there may exist two privacy divides each under the control of each seat occupant respectively. Therefore, an occupant of one seat has control that is independent of the neighboring seat.

Referring to FIG. 6, a side view 600 of a fan fold 602 coupled to a seat side rail 604 mounted on a back side 606 of a seat is described. Seat side rail 604 may comprise a plurality of points 608 and 610 for fan fold 602 to move up or down This movement may be achieved through attaching points on the fan fold 602 at different locations to the side rail 604 of the seat. For example, points 612 may slide up or down seat side rail 606 and be stabilized at different points 608 and 610 thereby fixing fan fold onto a fixed position Various lock points may exist by combining the seat side rail 604 with fan fold 602. For example, stow position lock points 614 may be provided for stowing the fan fold 602 to a fixed position when the fan fold 602 is not in use. Similarly, deploy position lock points 616 may be are provided for locking the fan fold 602 to a fixed position when the fan fold 602 is in use. Distance 618 may be provided which is dependent upon the type of seat.

It should be understood, of course, that the foregoing relates to preferred embodiments of the invention and that modifications may be made without departing from the spirit and scope of the invention as set forth in the following claims.

We claim:

1. A seat having a device for sub-dividing a space, comprising:
   a seating portion having a substantially flat surface for seating;
   a back member coupled to the substantially flat surface, the back member comprises an inner back surface and two side surfaces, each side surface having a breadth that is substantially the thickness of the back member;
   a sliding member integrally attached to at least one side surface; and
   a privacy fan-type device for sub-dividing a space, comprising:
      a plurality of elongated dividing members each having,
         a first end rotably connected with the rest of the plurality of elongated dividing members by a connecting portion, wherein the connecting portion comprises a relatively non-moving point in relation to other connecting portions of the plurality of elongated first members, thereby forming a collective connecting portion, and
         a second free end capable of moving apart from the plurality of second free ends of the other members in a uniformly manner, thereby using the length of the elongated dividing member as a radius spanning an area wherein the area forms part of a circle for subdividing a space; and
      a mounting member coupled to the collective connecting portion disposed to be slidably mounted to the sliding member having at least one stable location for spanning the area for subdivision.

2. The seat of claim 1 is further comprised of a hinging member connecting the back member and the substantially flat surface.

3. The seat of claim 1, wherein the sliding member comprises a rail for the fan-type device to slide up and down on at least one side surface.

4. The seat of claim 1 is further comprised of a folding material foldingly attached to the plurality of elongated dividing members, folding material substantially covering the area.

5. A seating arrangement, comprising:
   at least two rows of seats, each row includes a plurality of seats, each seats comprising:
      a seating portion having a substantially flat surface for seating;
      a back member coupled to the substantially flat surface, the back member comprises an inner back surface and two side surfaces, each side surfaces having a breadth that is substantially the thickness of the back member;
      a sliding member integrally attached to at least one side surface; and
      a privacy fan-type device for sub-dividing a space, comprising:
         a plurality of elongated dividing members each having,
            a first end rotably connected with the rest of the plurality of elongated dividing members by a connecting portion, wherein the connecting portion comprises a relatively non-moving point in relation to other connecting portions of the plurality of elongated first members, thereby forming a collective connecting portion, and
            a second free end capable of moving apart from the a plurality of second free ends of the other members in a uniformly manner, thereby using the length of the elongated dividing member as a radius spanning an area wherein the area forms part of a circle for subdividing a space; and
         a mounting member coupled to the collective connecting portion disposed to be slidably mounted to the sliding member having at least one stable location for spanning the area for subdivision.

6. The seating arrangement of claim 5, wherein the at least two rows of seats are part of a moving vehicle.

7. The seating arrangement of claim 5, wherein the at least two rows of seats are part of an indoor environment.

8. A method for dividing a space between two seats, comprising the steps of:

providing at least two seats each having a seating portion and a back member;

providing a fan-type device for sub-dividing a space;

mounting the fan-type device to one of the at least two seats;

opening the fan-type device for providing privacy;

providing a sliding member integrally attached to at least one side surface of the back member;

slidably connecting a mounting member of the fan-type device with the sliding member;

adjusting the fan-type device to reach desired privacy;

providing a stowing space along a side of one of the at least two seats;

folding the fan-type device if no privacy is desired; and stowing the fan-type device in the provided space.

* * * * *